June 23, 1931.                    M. STONE                    1,811,481
                         STROBO ROTOSCOPIC DEVICE
                           Filed Dec. 17, 1927
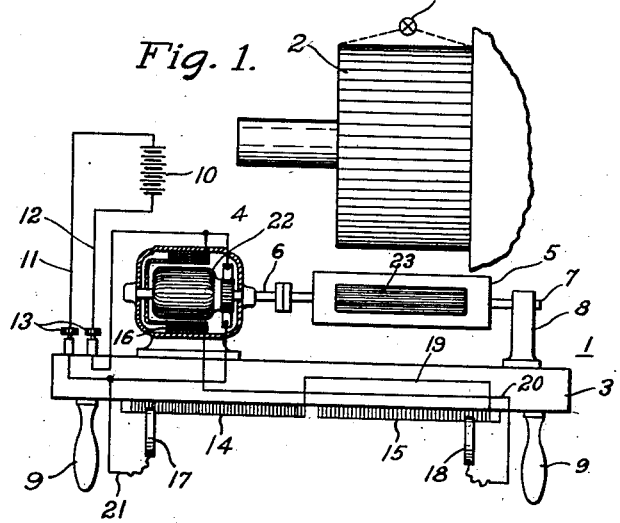
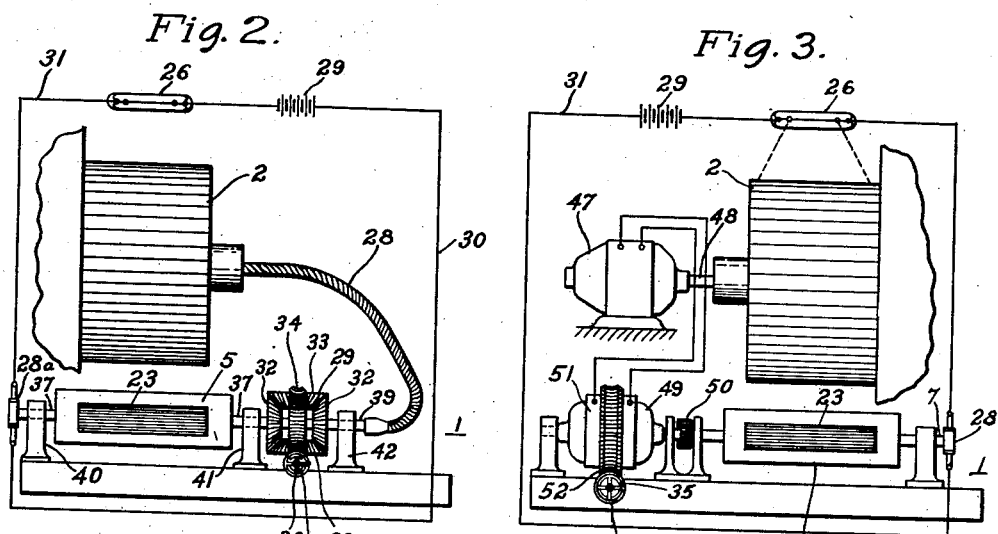
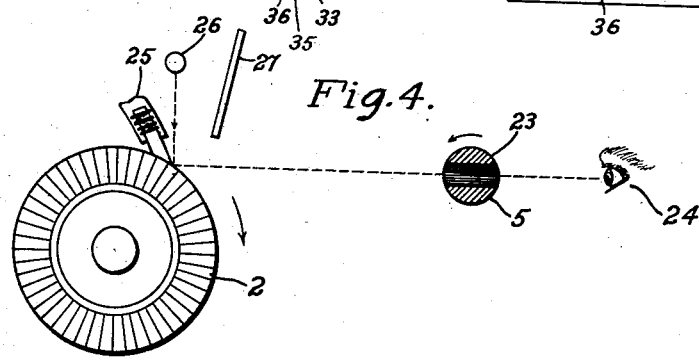
INVENTOR
*Morris Stone.*
BY
*Wesley Carr*
ATTORNEY Patented June 23, 1931

1,811,481

UNITED STATES PATENT OFFICE

MORRIS STONE, OF WILKINSBURG, PENNSYLVANIA, ASSIGNOR TO WESTINGHOUSE ELECTRIC & MANUFACTURING COMPANY, A CORPORATION OF PENNSYLVANIA

STROBO-ROTOSCOPIC DEVICE

Application filed December 17, 1927. Serial No. 240,840.

My invention relates to devices for studying or observing the successive phases of a periodic or varying motion.

My invention resides particularly in apparatus comprising the combination of a stroboscope and a rotoscope for observing the commutation of individual commutator bars while said commutator is operating.

Heretofore, stroboscopes have been utilized in studying and observing the sparking of rotating commutators, but such stroboscopes while enabling an observation of a particular commutator bar have been subject to a disadvantage in that, it was impossible to tell exactly which bar was sparking because the sparking was apparently of such intensity that the lamp was not of sufficient brightness to overcome the illusion on the eye.

With a rotoscope alone, it has been impossible to tell exactly which bar was sparking because the image of the bar does not appear stationary but moves slowly across the field of vision. Another disadvantage of the prior art rotoscopic devices resides in the fact that they have been driven by centrifugally governed spring motor devices, which do not operate at constant speed.

In accordance with my invention, a rotoscope for observing the sparking of a single commutator bar is produced by increasing the intensity of light in the area of the sparking bar, by providing an observation slit that is much narrower than has heretofore been the practice and by controlling the speed of the slit to exactly conform with the speed of the rotating commutator.

In accordance with a modification of my invention I combine the actions of a rotoscope with a stroboscope in order that the sparking of a particular commutator bar may be accurately studied and observed.

For an understanding of my invention and modifications of forms my apparatus may take, reference is to be had to the accompanying drawings, in which Figure 1 is a view in elevation of a rotoscope constructed in accordance with my invention, Fig. 2 is a view in elevation of a modification of a strobo-rotoscope constructed in accordance with my invention, Fig. 3 is a view similar to Fig. 2 of another modification of a strobo-rotoscope constructed in accordance with my invention, and Fig. 4 is a schematic diagram illustrating the operation of the devices shown in the above mentioned figures.

Referring particularly to Fig. 1, a rotoscope 1 is shown disposed near a commutator 2 of an electrical machine. The brushes have been omitted from the commutator of Fig. 1 for clearness of illustration, but one of them is shown in a proper position in the schematic diagram of Fig. 4. The rotoscope 1 comprises, in general, a base portion 3 having a motor 4 mounted thereon, a cylinder 5 formed of metal, or the like, is coupled to the shaft 6 of the motor 4 and is provided with a pin 7 that is journaled to a bearing 8, in turn, mounted on the base portion 3. The base portion 3 is provided with handles 9 that are preferably mounted to extend below the base portion 3 so that the entire device including the motor 4 and the cylinder 5 may be manually held. The motor 4 is preferably a constant current shunt wound motor that is energized in any suitable manner, as, for example, by a battery 10 that is connected by conductors 11 and 12 to the terminals 13 of the motor 4, a conductor extending from each of said terminals to the motor armature. The terminals 13 are preferably mounted on the base portion 3. A plurality of resistors 14 and 15 are mounted preferably on the plate 3 and are connected in electrical series circuit relation with the shunt winding 16 of the motor 4 by slides 17 and 18 and conductors 19, 20 and 21. Movement of slide 17 toward the right, Fig. 1, decreases the amount of resistance in the shunt field of motor 4 to decrease the speed of armature 22. Movement of slide 18 toward the left, Fig. 1, increases the amount of resistance in the shunt field of motor 4 and increases the speed of armature 22.

The cylinder 5 comprises a light-transmitting passage, which comprises preferably a plurality of slits, windows or passages 23 that are parallel to each other, and are parallel to the center line of the cylinder. These slits are preferably about 1/16 to 1/32 of an inch wide. The entire surface of the cylinder 5 is preferably coated with a black paint to render it light absorbing.

The relative position of the eye 24 of the observer, the cylinder 5, the commutator 2, the brush 25 and the lamp 26 with respect to each other are clearly shown in Fig. 4. A shade 27 is preferably set up between the lamp 26 and the eye 24 of the observer.

The speed of the motor and cylinder 5 is controlled by varying the position of the slides 17 and 18 until the speed of the cylinder 5 is equal to exactly ½ of the speed of the commutator 2. In such case for every complete revolution of the commutator 2 the parallel slits 23 permit the eye 24 to see the same bar on the commutator 2. The parts operate so rapidly that any individual commutator bar that is being observed appears stationary. The lamp 26, by which illumination of the commutator is effected, is constantly lighted, as viewed in Fig. 1. After one commutator bar has been observed and studied the next commutator bar or any commutator bar may be observed by increasing or decreasing the speed of the cylinder 5 and then bringing it back to a speed corresponding to the speed of the commutator 2. This is accomplished by momentarily moving either the slide 18 or 17, respectively, toward the left or right, Fig. 1, and then returning the slide to its original position.

The rotoscope 1 is simple, portable, light and separately operative for many applications. It will, of course, be understood that the brilliancy of the lamp 26 should be increased as the size of the slits 23 is decreased so that the particular commutator bar undergoing observation will be readily visible.

Referring to Fig. 2 a strobo-rotoscope 27 constructed in accordance with my invention is shown together with a commutator 2. In this modification of my invention, the cylinder 5 previously described with reference to Fig. 1 is driven at a speed corresponding to the speed of the commutator 2 by a flexible coupling 28 and a differential gear mechanism 29. The lamp 26, illustrated in Fig. 2 is not continuously illuminated but is adapted to be flashed periodically in accordance with the speed of the cylinder 5, preferably by a contactor 28a mounted on the end of the shaft 7 of the cylinder 5. The lamp 26, preferably, is a neon gas filled lamp having a quick response to the flow of a current. The circuit of the flashing lamp 26 comprises a source of electromotive force, such as battery 29, conductor 30, contactor 28a, and a conductor 31. The contactor 28a is preferably arranged to light the lamp 26 each time the slits 23 of the cylinder 5 permit a view of the commutator 2 when the latter is observed from a position corresponding to the position of the eye 24 as shown in Fig. 4.

The relative angular position of the cylinder 5 with respect to the commutator 2 is shifted by the differential gear mechanism 29 comprising the well known sun gears 32 and planetary gears 33. The planetary gears 33 are preferably pivoted within a worm gear 34 that is adjustably retained in position by a cooperating worm gear 35 mounted on the base portion 1. The shaft of the worm gear 35 may be provided with an adjustable handle 36 for conveniently changing the position of the planetary gears 33 and thereby changing the relative angular position of the cylinder 5 with respect to the commutator 2. The shaft 7 of the cylinder 5 and the shafts 37 and 39 of the differential gear mechanism 29 respectively are journaled, preferably, to the respective bearing standards 40, 41 and 42 that are mounted on the base portion 1.

For each revolution of the commutator 2, the lamp 26 is lighted and the illuminated commutator 2 may be observed through the slits 23 of the cylinder 5. Any bar of the commutator 2 may be readily observed by turning the handle 36 as indicated above. Turning the handle 9 adjusts both the position of the cylinder 5 with respect to the commutator 2, and the time of the flashing of the lamp 26 by the contacts 28. At any position of the commutator 2 with respect to the cylinder 5 the speed of the cylinder and the commutator are exactly the same but, by turning the worm gear 34 any particular bar may be observed.

The combination with the stroboscopic action of the light 26 on the commutator 2 combined with the rotoscopic effect of the cylinder 5 with respect to the commutator 2 provides a highly desirable picture showing exactly the phenomena taking place between any particular commutator bar while coacting with the brush 25. All of the desirable features of the stroboscope are combined with the desirable features of the rotoscope when the two are combined in accordance with my invention.

A modification of the arrangement for obtaining identical speed between the commutator 2, and the cylinder 5 together with means for shifting the relative angular position between the two is shown in Fig. 3. An asynchronous generator 47 is driven preferably, in accordance with the speed of rotation of the commutator 2 by a direct coupling 48. The asynchronous generator 47 energizes a synchronous motor 49 that is mounted on the base 1 and drives the cylinder 5 through suitable reduction gears 50. The angular position of the cylinder 5 with respect to the commutator 2 may be changed in this case by varying the position of the stator 51 of the synchronous motor 49. Such variation may be effected in any suitable manner as for example, by a semi-circular worm gear 52 secured to the stator 51 of the motor 49 and a worm gear 35 journaled to the base 1. As indicated in Fig. 2, the worm gear 35 may be adjusted by turning a handle 36. The modification shown in Fig. 3 eliminates the flexible coupling 28 and the planetary gear system 29 shown in Fig. 2.

In order to shift the cylinder 5 and the time that the lamp 26 lights synchronously from one commutator bar to the next requires merely a shifting of the stator 51 of the synchronous motor 49 by means of the handle 36. Since the cylinder 5 is adapted to turn one-half as fast as the commutator 2, it is only necessary to shift the stator of the synchronous motor 51 through an angle of 180° in order to include all of the commutator bars of the commutator 2 within the proper range of adjustment.

In general, the combination of a stroboscope and a rotoscope is highly desirable by virtue of the fact that neither one interferes with the function of the other and each performs its separate function. The combination of the two devices render the bar under observation plainly visible and correlates the flash of the lamp with the position of the bar, in such manner that the exact bar that is sparking can readily be observed, a result that has heretofore to my knowledge not been accomplished and has long been sought for by those skilled in the art.

Although the mechanism shown in Fig. 1 is illustrated as comprising a source of light constantly illuminated while the mechanisms shown in Figs. 2 and 3 are shown in conjunction with flickering sources of light, it shall be understood that my invention is not to be thus limited, for a flickering light may be utilized with the arrangement shown in Fig. 1 and constantly illuminated sources of light with the arrangements shown in Figs. 2 and 3.

In the appended claims, the expression "constant-speed motive device" shall be understood as comprehending only a motive device which operates at constant speed, or substantially so, in contradistinction to a motive device, such as spring motor, which operates at one speed when the spring is tightly wound and at relatively slower speed when the spring is not so tightly wound.

It will readily be understood that various modifications and changes may be made in my invention without departing from the spirit and scope thereof, as set forth in the appended claims.

I claim as my invention:

1. An instrument for observing the successive phases of a periodic motion comprising the combination with means for periodically flashing a light, and means for periodically exposing said phases to be viewed only during said flashing periods.

2. An instrument for observing the co-action between a stationary member and a rotating member co-acting therewith comprising the combination with means for intermittently energizing a light source for illuminating said rotating member only when said rotating member is leaving said stationary member, and means for screening said rotating member from view except during said flashing periods.

3. In combination, means for brilliantly illuminating a commutator of an electrical machine momentarily at each revolution thereof, and means for observing only a particular segment of said commutator at said lighting period.

4. In combination, a rotatable member having a window therein for observing a particular area of a moving member, means for rotating said rotatable member to cause said window to permit a line of vision momentarily for every revolution of said moving member, and means for illuminating said area momentarily during the moment when said line of vision is established.

5. In combination, a solid cylinder having parallel slits therein for observing an area of a rotating member, means for rotating said cylinder to cause said window to permit a line of vision momentarily for every revolution of a point on said member, means for illuminating said area momentarily for every such revolution at the time said line of vision is established, and means for changing the angular relation between said cylinder and said rotating member.

6. In combination, a shaft, means for rotating said shaft a speed equal to one half of the speed of rotation of a rotating member, means for changing the angular position of said shaft with respect to said member, means associated with said shaft for illuminating said member momentarily for every revolution thereof, and means including said shaft for only observing an area of said member at the time of said illumination.

7. In combination, a shaft, means for rotating said shaft at a speed equal to one-half of the speed of rotation of a commutator, means for changing the angular position of said shaft with respect to said commutator, means associated with said shaft for illuminating said commutator momentarily for every revolution of said commutator, and means including a cylinder having slits therein driven by said shaft for observing the commutation of one of the segments of said commutator at the time of said illumination.

8. In combination, a rotatable stroboscopic device, and means for rotating said device in accordance with the speed of a rotating member comprising a flexible mechanical coupling secured to said member and said device, and means comprising a differential gear mechanism for changing the angular position of said device with respect to said member.

9. A strobo-rotoscope comprising a shutter, a lamp associated with said shutter and means for continuously operating said shutter and intermittently lighting said lamp in synchronism with each other, whereby a line of vision is intermittently established through said shutter to an object exclusively at the time said lamp is lighted to illuminate the object.

10. In combination, a movable member having a window for periodically passing a line of vision to a movable object, means for periodically illuminating said object so that said window appears to stand still, a member for driving said member and means between the driving and driven members for shifting the driven member to vary the angle of said line during the movement of the driven member.

In testimony whereof, I have hereunto subscribed my name this 15th day of December, 1927.

MORRIS STONE.